United States Patent [19]

Hoyt et al.

[11] Patent Number: 4,575,531

[45] Date of Patent: Mar. 11, 1986

[54] PARTIALLY HYDROLYZED ETHYLENE-VINYL ACETATE (EVA) ELASTOMERS VULCANIZABLE WITH SULFUR

[75] Inventors: John M. Hoyt, Cincinnati; Steven D. Blazey, Akron, both of Ohio

[73] Assignee: National Distillers and Chemical Corporation, New York, N.Y.

[21] Appl. No.: 668,606

[22] Filed: Nov. 7, 1984

[51] Int. Cl.$^4$ ............................................. C08L 31/02
[52] U.S. Cl. ..................................... 524/563; 525/60; 525/61; 525/330.4; 525/349; 525/350; 525/351; 525/352; 525/354; 528/480; 528/503
[58] Field of Search ................ 525/60, 61, 330.4, 349, 525/351, 354, 350, 352; 524/563

[56] References Cited

U.S. PATENT DOCUMENTS

| | | | |
|---|---|---|---|
| 2,388,169 | 10/1945 | McAlevy et al. | 525/330.4 |
| 3,435,010 | 3/1969 | Starer et al. | 525/330.4 |
| 3,458,461 | 7/1969 | Mihal | 525/330.4 |
| 3,972,857 | 8/1976 | Kaizerman et al. | 525/330.4 |

FOREIGN PATENT DOCUMENTS 0589499  6/1947  United Kingdom ............ 525/330.4

*Primary Examiner*—Paul R. Michl
*Assistant Examiner*—J. M. Reddick
*Attorney, Agent, or Firm*—Kenneth D. Tremain

[57] ABSTRACT

Sulfur vulcanizable partially hydrolyzed ethylene-vinyl acetate terpolymers and processes for producing these products are disclosed.

11 Claims, No Drawings

4,575,531

PARTIALLY HYDROLYZED ETHYLENE-VINYL ACETATE (EVA) ELASTOMERS VULCANIZABLE WITH SULFUR

FIELD OF THE INVENTION

This invention relates to sulfur vulcanizable, partially hydrolyzed EVA elastomers with improved heat aging and oil resistance properties. More particularly, the invention is directed to processes for producing the aforesaid materials and their sulfur vulcanized compositions.

BACKGROUND OF THE INVENTION

Vulcanization of elastomers with sulfur has been employed for a long time. Rubber elasticity, resistance to cold flow and improved strength are imparted. The rubber loses its tackiness, becomes insoluble in solvents and is more resistant to deterioration by heat and light. Natural rubber (cis-1,4-polyisoprene) contains one in-chain carbon-carbon double bond per enchained monomer unit, providing more than enough cure sites for sulfur vulcanization. Styrene-butadiene copolymer, a common synthetic rubber, also owes its sulfur vulcanizability to carbon-carbon double bond unsaturation, again present in excess over what is needed for vulcanization.

Saturated elastomers, for example, ethylene-propylene rubbers (EPR) inherently lack carbon-carbon double bond unsaturation and therefore cannot be directly vulcanized with sulfur. An appropriate strategy is to introduce unsaturation by terpolymerization of a few percent of a bifunctional monomer such as 1,5-hexadiene, ethylidenenorbornene or dicyclopentadiene. One double bond of the enchained diene unit survives the terpolymerization process and remains to serve as a cure site for sulfur vulcanization. Alternatively, EPR can be vulcanized with peroxides, a process that is satisfactory with a saturated elastomer and does not require the presence of unsaturation.

EVA copolymer elastomers are also known in the art (I. O. Salyer and H. M. Leeper, *Rubber Age,* June and July, 1971), and since they too are saturated materials, they are cured with peroxides. Peroxide-cured EVA rubbers possess good thermal stability, good oil resistance and reasonably good low temperature properties. Nevertheless, decomposition products from peroxide curing can cause porosity in the finished product, especially in open or atmospheric pressure cures; other vulcanization systems are therefore desirable. Moreover, rubber formulators very often blend two or more elastomers to achieve a desired balance of properties in the finished product and, as most common elastomers are vulcanized with sulfur, it would be advantageous to have sulfur-vulcanizable EVA elastomers for blending purposes.

Although it is not practiced to any great extent, sulfur vulcanization of EVA elastomers is nevertheless known in the art. A method commonly chosen to impart sulfur vulcanizability to EVA elastomers involves thermal or catalytic deacetylation of the copolymer, with the evolution of acetic acid and the concomitant introduction of sufficient carbon-carbon double bond unsaturation as cure-sites. For example, McAlvey, et al. (U.S. Pat. No. 2,388,169) pyrolyzed EVA at temperatures between 250° and 400° C. at atmospheric pressure in an inert gas or in solution in a solvent. The pyrolyzed copolymer was vulcanized with a typical sulfur vulcanization system. However, according to McAlvey et al., tensile strengths of no better than 700–950 psi were observed for sulfur-vulcanized EVA copolymers containing 60–70 weight percent vinyl acetate, the compositions known to exhibit the best oil resistance (I. O. Salyer and H. M. Leeper, *Rubber Age,* July, 1971). Moreover, Van Saane et al. (U.S. Pat. No. 3,451,983) disclose that the EVA pyrolysis process of McAlvey et al., performed in the presence of an inert gas at atmospheric pressure or in a solvent, has the drawback that the resulting unsaturated EVA copolymers are also crosslinked to a high degree, and must be decomposed before they can be processed further. Van Saane et al. avoid crosslinking during pyrolysis of EVA by conducting the process in an organic diluent under pressure; e.g., of at least 90 atmospheres of ethylene.

According to Bernhardt et al. (U.S. Pat. No. 4,004,069), when EVA copolymers are deacetylated thermally, or catalytically with a protonic or Lewis acid, under a vacuum of less than about 50 Torr. while continuously removing acetic acid released as in a heated vacuum double screw extruder, the corresponding olefinically unsaturated linear polymers are produced; i.e., crosslinking is avoided. It would appear that the deacetylations done in an extruder by Berhardt et al. involve more or less shearing of the EVA. There is no disclosure by Bernhardt et al. regarding the influence of stabilizers during deacetylation. Finally, in Ger Offen. No. 2,413,064, Bernhardt et al. disclose sulfur vulcanization of deacetylated EVA or of blends of deacetylated EVA with other rubbers.

However, in a scientific study [*Polymer Letters* 11, 521 (1973)] of the thermal deacetylation of an EVA copolymer containing 38.5 weight percent of vinyl acetate, at 260°–290° C., and in a vacuum $10^{-4}$ to $10^{-5}$ mm Hg in sealed ampules with continuous removal of acetic acid by freezing out, Razuvaev et al. found that the copolymer rapidly crosslinks and that the rate of formation of crosslinked material has an autocatalytic character. Razuvaev et al. also found that protonic and Lewis acids accelerate deacetylation and that radical reaction inhibitors (triphenylmethane, or 2,4,6-tritertiary-butyl-phenol) had no effect. It is reasonable to infer that shear was not involved in deacetylations done in sealed ampules by Razuvaev et al.

Deacetylation during the sulfur vulcanization process itself has apparently been accomplished by Miyakawa et al. (Jap. Kokai No. 75,138,044), who include benzenesulfonic acid, a deacetylation catalyst, in the vulcanization formulation.

In contrast to the above described conventional schemes for vulcanization for EVA copolymer elastomers in which unsaturation must be introduced before vulcanization can occur, another radically different type of sulfur vulcanization procedure for EVA elastomers is known in the art. Thus, Kaiserman et al. (U.S. Pat. No. 3,972,857) substituted small amounts of α-chloroacetoxy groups for some of the acetoxy groups of EVA copolymer elastomers by acidolysis of the EVA with chloroacetic acid in xylene solution, removing the corresponding small amount of acetic acid released by azeotrpic distillation. The ethylene-vinyl acetate-vinyl chloroacetate terpolymer compositions thus produced by post-polymerization chemical modification were vulcanized by fast soap-sulfur vulcanizaton systems developed for acrylate ester elastomers, e.g. U.S. Pat. No. 3,458,461. The said acrylate ester elastomers also contain a few percent of vinyl chloroacetate cure sites introduced by copolymerization with vinyl chloracetate. Finally, grafts of acrylate ester containing vinyl chloroacetate cure sites have been made onto EVA elastomers and the resulting grafted polymer products cured with soap-sulfur systems by Chang et al. (U.S. Pat. No. 4,202,845).

The mechanism of soap-sulfur vulcanization of acrylate ester rubbers containing vinyl chloroacetate curesites has been studied by Kaendler et al. [*Die Angewandte Makromolekulare Chemie* 29/30, 241 (1973)]. These authors propose that HCl is eliminated between an α-hydrogen of an acrylate ester unit in one chain and the active Cl atom of chloroacetoxy group in another chain with the formation of an $S_X$ bridge between the two carbon atoms. The function of the soap is to neutralize HCl released. Carbon-carbon double bond unsaturation is not invoked in this cure mechanism.

SUMMARY OF THE INVENTION

In accordance with the present invention, sulfur vulcanizable, partially hydrolyzed EVA elastomers are produced which preferably contain a molecular weight (MW) stabilizer to minimize or prevent crosslinking and gelation under shear at elevated temperatures. Partially hydrolyzed EVA copolymer elastomers of this invention that are intended for conventional sulfur vulcanization are modified by thermal treatment under shear to introduce sufficient unsaturation by deacetylation, said thermal modification either preceding or following the process of partial hydrolysis. Partially hydrolyzed EVA copolymer elastomers intended for sulfur vulcanization by fast soap-sulfur cure systems are modified by partial re-esterfication with a haloacetic acid e.g. chloroacetic acid prior to vulcanization to introduce chloroacetoxy cure-sites sufficient for said soap-sulfur vulcanization. The resulting partially hydrolyzed modified EVA elastomers are then blended with the appropriate sulfur cure system, sulfur and reinforcing agent/filler. After blending, the compositions can be cured.

The sulfur vulcanized, partially hydrolyzed EVA compositions of this invention have superior high temperature resistance and better oil resistance compared to the sulfur vulcanized unhydrolyzed EVA copolymer elastomer compositions.

DETAILS OF THE INVENTION

The EVA copolymer used as the principal starting material in this invention is an EVA copolymer elastomer initially containing about 35 to about 75 weight percent vinyl acetate and on partial hydrolysis contains about 0.5 to about 50 weight percent vinyl alcohol. The preferred initial EVA copolymer used in this invention contains about 40 to about 65 weight percent vinyl acetate and on partical hydrolysis contains from about 4 to about 25 weight percent vinyl alcohol. The melt flow rate of the useful partially hydrolyzed EVA polymers can range from about 0.05 to about 150 grams or greater per 10 minutes. The preferred melt flow rate ranges from about 0.5 to about 25 grams per 10 minutes. The procedure employed for measuring melt flow rate is disclosed hereinbelow.

As pointed out above, the partially hydrolyzed EVA copolymers of this invention preferably contain a MW-stabilizing additive when the copolymer is to be exposed to shear conditions at temperatures in the range of 180°-280° C. and higher for periods of up to 1 hour or longer. The presence of a MW-stabilizer is necessary to minimize crosslinking reactions and to keep the gel content of the copolymer below about 10% by weight so that there is no serious loss of processibility during subsequent compounding. For the higher molecular weight EVA copolymer elastomers, those having a melt flow rate of less than about 2 grams per 10 minutes, the presence of said MW-stabilizing additive is almost mandatory if extensive crosslinking and gelation are to be avoided. With lower molecular weight EVA elastomers, having melt flow rates above about 2 grams per 10 minutes, crosslinking and gelation can often be avoided in the absence of a MW-stabilizer, but it is preferred to employ said MW-stabilizing additives even with said lower molecular weight copolymers to guard against the effects of unanticipated surges in shear and temperature during processing that might contribute to unwanted gelation. In general, the longer the EVA elastomer is exposed to shear at elevated temperature, the greater the need for a MW-stabilizing additive to be present.

By MW-stabilizer we mean a substance which, when present in an EVA copolymer or partially hydrolyzed EVA copolymer undergoing thermal modification under shear conditions to introduce unsaturation for sulfur vulcanization, will suppress or prevent molecular weight-increasing side reactions that lead to cross-linking and gelation. A convenient test of the relative efficiency of a MW-stabilizer involves measurement of molecular weight change on milling a polymer specimen containing a given level of candidate stabilizer under standard operating conditions of interest that involve thermal treatment and shear. Milling can be done in a Brabender plastograph. Mooney viscosity change is a convenient measure of molecular weight change in elastomers under such test conditions. The higher the Mooney viscosity, the higher the molecular weight. Thus the stabilizer with which the smallest increase in Mooney viscosity is observed on milling under shear conditions at the thermal treatment temperatures of interest is the most efficient MW-stabilizer.

The MW-stabilizers are compounds known as antioxidants, inhibitors of free radical reactions, light stabilizers, and the equivalents thereof, and minimize molecular weight increase and prevent gelation of EVA copolymers and their hydrolyzed derivatives upon heating under shear. The mechanism or mechanisms of said MW-stabilization are uncertain. Carbon-carbon double bond unsaturation being introduced by deacetylation in the thermal modification process itself may interact with buried macroradical fragments, with macroradicals produced by shear and with macroradicals arising through decomposition of traces of peroxy compounds. It is, for example, known in the art (McClaim et al., U.S. Pat. No. 4,150,003) that 0.5 weight % of Santowhite Crystals [4,4-thiobis 6-tertiary butyl-m-cresol] will prevent undesirable increases in molecular weight (Mooney viscosity) of EVA during dispersion in water at about 200° C. under vigorous stirring conditions. Moreover, as in the present invention, it was also observed by McClain et al. that the presence of a stabilizer was more critical for nigher molecular weight EVA copolymers than it was for lower molecular weight EVA colpolymers. In this instance, large increases in molecular weight during dispersion led to a coarse, granular product instead of the desired finely-divided material.

Examples of specific MW-stabilizers for the process of this invention are Agerite Resin D, Antioxidant 2246, Mark C. The identity and supplier(s) of these compounds are further disclosed hereinbelow. Of these compounds, a preferred compound is the aforementioned Agerite Resin D. The amount of MW-stabilizer to be used in the copolymer composition is about 0.1 to about 5 weight percent, preferably about 0.3 to about 3 weight percent of the total copolymer composition.

Before partially hydrolyzed EVA copolymer elastomers can be vulcanized by sulfur according to conventional sulfur vulcanization technology, carbon-carbon double bond unsaturation must be introduced by thermal modification. The thermal modification process can precede or follow the partial hydrolysis step. Thermal modification followed by hydrolysis is preferred. By thermal modification, we mean heating at temperatures of about 150° to about 300° C., preferably about 180° to about 280° C., in a mixing device imparting shear, said EVA copolymer or hydrolyzed copolymer containing a MW-stabilizer sufficient to suppress crosslinking, until sufficient unsaturation is introduced to permit subsequent sulfur vulcanization.

Broadly, the amount of carbon-carbon double bond unsaturation introduced by thermal deacetylation for sulfur vulcanizations is about 0.5 to about 10 weight % of —CH=CH— groups, preferably about 2 to about 5 weight percent. The duration of thermal modification is broadly about 10 seconds to about 5 hours. The preferred thermal modification time is about 10 minutes to about 1 hour.

By hydrolysis, we mean any known process whereby enchained vinyl acetate units in the EVA copolymer are chemically transformed to vinyl alcohol units, for example by saponification with an alkali or alkaline earth metal hydroxide, bicarbonate, carbonate, e.g. sodium hydroxide, or by alcoholysis with a lower alkyl alcohol, e.g. methanol, in the presence of an alkali or alkaline earth metal alkoxide, e.g. sodium methoxide. Although solvents known in the art may be employed, e.g. toluene, so that the hydrolysis procedure may be accomplished with EVA copolymer in the dissolved state, it is preferred to perform the hydrolysis in the molten copolymer phase by the process of saponification with an alkali metal hydroxide in the presence of a small amount of water.

When the partially hydrolyzed EVA copolymer elastomers of this invention are produced by saponification with an alkali metal hydroxide in the presences of a minor amount of water, sodium acetate is formed as a by-product. The by-product sodium acetate can normally be left in the partially hydrolyzed EVA elastomer without serious consequences since the degree of hydrolysis is generally low. However, as will be shown hereinafter, the by-product sodium acetate, if so desired, can be removed from the partially hydrolyzed elastomer products of the invention by extraction with a solvent, e.g. water. The extraction will be done after hydrolysis, either before or after any subsequent thermal modification. And, as will be shown hereinafter, good results are obtained with the finished, sulfur-vulcanized EVA elastomer compositions of this invention are extracted with hot water; little deterioration of tensile strength and elongation is observed.

The above-described thermal modification and partial hydrolysis processes can be carried out in the molten polymer phase by a batch or continuous method. In the laboratory it is convenient to operate in a Brabender Plastograph, on a 40-gram scale, or in a Brabender Prep Center where up to about 220 to about 230 grams of material can conveniently be accommodated. Further scale up can be accomplished with a Banbury mixer or a kneader. A mixing time of a few seconds to one hour is normally all that is needed to complete the thermal modification, and a similar time span will usually suffice for the partial hydrolysis rocess. An inert atmosphere ($N_2$) should be maintained throughout.

For a continuous process, the use of a continuous processor or a twin screw extruder is often particularly convenient. The ingredients or reactants can be fed into the machine hopper together with the resin or injected separately into the interior of the apparatus particularly at a point where some heat softening of the resin has already taken place. The reaction proceeds as the mixture is forwarded through the apparatus, and with an appropriate adjustment of the forwarding rate, the residence time can be chosen such that the reaction is completed to the required degree. Both partial hydrolysis and thermal modification can be done sequentially in a single pass or the product either of the aforesaid processes can be collected, stored and further processed at a later time. Two independent processing units can be operated in tandem or, if desired, the thermal modification and partial hydrolysis processes can be performed simultaneously, in a single piece of processing equipment.

When it is desired to effect sulfur vulcanization of the partially hydrolyzed EVA copolymer elastomers of this invention with a fast soap-sulfur cure that requires the presence of a few percent of chloroacetoxy groups as cure-sites, the hydrolysis is performed first, before attempting to introduce the said chloroacetoxy cure sties. The hydrolysis may be done by any of the above-disclosed processes of the art and to the above-mentioned degree of partial hydrolysis. It is preferable, however, to accomplish the hydrolysis by alcoholysis with an alcohol in a solvent such as toluene, employing sodium hydroxide or sodium methoxide as the hydrolyzing agent. After the desired degree of partial hydrolysis of the EVA copolymer elastomer is reached, a portion of the vinyl alcohol units thus introduced is subsequently re-esterified by reaction with chloroacetic acid, preferably employing azeotropic distillation to remove by-product water. The amount of chloroacetoxy groups thus introduced into the partially hydrolyzed EVA elastomer is carefully adjusted to provide about 0.2 to about 8 weight of incorporated vinyl chloroacetate, preferably about 1 to about 3 weight percent.

Halogenated organic acids other than chloroacetic acid may be used in the foregoing process and generally, any halogenated or organic acid that will esterify with the vinyl alcohol in the polymer chain may be employed and substantially the same results obtained as those obtained with chloroacetic acid. The halogenated organic acids that specifically may be employed in this regard comprise those acids containing from about 2 to about 6 carbon atoms especially from about 2 to about 4 carbon atoms and comprise the alkanoic acids whether straight chain or branched chain, however, straight chained acids are preferred. Although polyhalogenated organic acids may be employed, such as those containing from about 2 to about 3 halogen atoms per molecule of halogenated organic acid the monohalogenated acids are especially preferred. The halogen substituents in this respect comprise fluorine, chlorine, bromine and iodine and especially chlorine.

As stated previously, the vinyl alcohol portion of the hydrolyzed ethylene-vinyl acetate molecule will react with the chloroacetic acid to form a vinlychloroacetate group along the polymer chain, the vinylchloroacetate being present in the polymers of the present invention anywhere from about 0.2 to about 8 weight % and especially from about 1 to about 3 weight %. When halogenated organic acids are employed other than chloroacetic acid, an equivalent amount of the halogenated organic acid may be added either in whole or in part to the vinyl alcohol of the polymer. Accordingly, the addition of the halogenated organic acid to the vinyl alcohol component of the polymer is described for the purposes herein as equivalents in terms of vinylchloroacetate. Thus, when chloropropionic acid is used in whole or in part as a substitute for chloroacetic acid, the actual weight % of the resulting vinylchloropropionate will be somewhat higher than the 0.2 to about 8 weight % or 1 to about 3 weight % of vinylchloroacetate since the molecular weight of chloropropionic acid is somewhat higher than that of vinylchloroacetate. The same number of molecules of chloropropionic acid, however will be present on the molecular chain as vinylchloroacetate since an equivalent amount of this halogenated organic acid is employed in whole or in part in lieu of the chloroacetic acid.

As indicated previously, mixtures of halogenated organic acids may be employed. Examples of the various halogenated organic acids that are employed in this regard include chloropropionic, chlorocrotonic acid, chlorobutyric acid, chloroiso-butryic acid, chlorohexanoic acid and the like.

Not all the vinyl alcohol groups introduced into the EVA copolymer by hydrolysis should be consumed by re-esterification with chloroacetic acid; otherwise, the improved heat stability and oil resistance of the partially hydrolyzed EVA copolymer elastomers of this invention may not be realized. The preferred content of vinyl alcohol is about 4 to about 25 weight percent. Introduction of too great a proportion of incorporated vinyl alcohol can have a deleterious effect on low temperature properties of the sulfur vulcanized elastomer, whereas too little will not significantly improve heat aging or oil resistance.

If desired, it is also possible to partially hydrolyze the EVA copolymer elastomer by the above disclosed process of melt phase saponification and thereafter effect partial re-esterification of some of the vinyl alcohol groups with chloroacetic acid to introduce sufficient incorporated vinylchloroacetate cure-sites for vulcanization, said re-esterification also being accomplished in the melt phase. When introducing chloroacetoxy cure-sites for fast soap-sulfur cure by the aforesaid melt phase process, a MW-stabilizer should be present to prevent unwanted crosslinking and gelation during any of the operations that are performed in the melt phase at elevated temperatures under shear conditions.

It is also within the scope of this invention to introduce into the same partially-hydrolyzed EVA elastomers both carbon-carbon double bond unsaturation as cure-sites for conventional sulfur vulcanization and chloroacetoxy groups for fast soap-sulfur vulcanization. After the partially hydrolyzed EVA copolymer elastomers of this invention, containing either carbon-carbon double bond unsaturation or chloroacetoxy groups as cure-sites for sulfur vulcanization, or both, have been prepared, the appropriate sulfur cure systems can be blended into them by procedures known to the art. The blending may, if desired, be done with any suitable blending equipment such as a two-roll rubber mill, Banbury mixer, twin screw processor, etc.; a two-roll rubber mill is preferred.

Irrespective of whether a conventional sulfur cure or a fast soap-sulfur cure is to be used, various filler/reinforcing agents may be employed, although it is within the scope of the invention to vulcanize unfilled compositions. Examples are various types of carbon black; e.g., furnace blacks, channel blacks, thermal blacks, and the like. Specific types of carbon blacks are fast extruding furnace (FEF) black, and high abrasion furnace (HAF) black. Other common filler/reinforcing agents include silica, alumina, clays, diatomaceous earth, barium sulfate, glass fibers and the like. FEF carbon black is preferred.

In general, the best strength properties are achieved where the filler is employed in about 30 to about 60 parts per 100 parts of the polymer. However, this value is only a guideline and from about 25 to about 100 parts filler may be employed for certain applications, and as little as about 1 to about 10 parts can be added.

In addition to a filler/reinforcing agent, the partially hydrolyzed EVA elastomers of this invention that are thermally modified to introduce unsaturation for conventional sulfur vulcanization will also be compounded with elemental sulfur, a vulcanization accelerator(s), accelerator activators, stabilizers and other agents for various purposes; e.g., plasticizers, scorch retarders, flame retardants, reinforcement promoters, etc.

The sulfur is generally used in the elemental form as the ground sulfur of commerce, perferably ground rhombic sulfur crystals. Sulfur compounds capable of liberating sulfur at vulcanizing temperatures are also used to effect vulcanization. The members of this group include tetramethylthiuram disulfide and its homologs, the corresponding tetrasulfide, dipentamethylene thiuram hexasulfide, dimorpholinyl disulfide, alkylphenol sulfides, sulfur chlorides, and the like. Sulfur compounds should be soluble in the copolymer or available in a finely divided form so they can be readily and uniformly dispersed in the polymer. The amount of sulfur used can range from about 0.5 to about 10 parts or more per 100 parts of polymer. Preferably, about 1 to about 5 parts of sulfur per 100 parts polymer are used.

Accelerators are added to the partially hydrolyzed EVA elastomers thermally modified to introduce unsaturation to permit vulcanization. The accelerators employed are those known to the art as accelerators for conventional sulfur vulcanization. Accelerators can be divided into principal chemical groups: thiazoles and derivatives; dithiocarbamates; thiurams; sulfenamides; guanidines; and aldehyde-amine reaction products. Other accelerators include xanthates and thioureas. Specific examples include: 2-mercaptobenzothiazole, benzothiazyl disulfide, N-cyclohexyl-2-benzothiazylsulfenamide, zinc diethyldithiocarbamate, tetramethylthiuram disulfide, tetramethylthiuram monosulfide, 1,3-diphenylguanidine, butyraldehyde-aniline condensation product, tellurium diethyldithiocarbamate, selenium diethyldithiocarbamate, zinc dimethyldithiocarbamate, and the like. As a general rule, the amount of accelerator used is about two times the amount of sulfur in the cure formulation. Generally, about 0.5 to about 10 parts of accelerator per 100 parts of polymer are used. Preferably, about 1 to about 5 parts of accelerator are used per 100 parts polymer.

Where desired, accelerator activators e.g., zinc oxide, stearic acid, aniline, animal fatty acid, red lead, coconut fatty acid, diethanolamine, hydroxystearic acid, oleic acid, magnesium oxide and the like, can be included in the cure recipe. These substances, generally, are not accelerators when used alone but in conjunction with a primary accelerator they increase the rate of vulcanization over that which is obtained with only the primary accelerator. The general argument for the use of an activator is that a fast cure rate may be obtained more economically be using a combination of accelerator and activator than by using a higher concentration of the accelerator. About 1 to about 10 parts or higher of activator per 100 parts polymer is generally sufficient to achieve the desired result.

In addition to substances added as MW-stabilizers during thermal modification and partial hydrolysis of the EVA elastomers of the invention, it may also be desirable to introduce additional stabilizers during the blending of the vulcanization ingredients in order to retard or prevent undesirable premature crosslinking that might take place during such processing and/or give satisfactory service life to the polymer by preventing or retarding degradation during use caused by the effects of oxidation, heat or light.

In addition to the MW-stabilizers disclosed hereinabove, many other classes of compounds are useful MW-stabilizers and/or antioxidants of the present compositions when added during compounding. These include substituted phenols and bisphenols, amines, mercaptides and sulfides, phosphites, etc. Examples include diphenylamine; reaction products of acetone with aniline or substituted anilines; reaction products of diphenylamine with acetone; derivatives of p-phenylenediamine; phenols alkylated with isobutylene or styrene; aryl phosphites; epoxidized natural oils; epoxidized esters of unsaturated acids, and the like.

Although many phenolic and amine type antioxidants can function as MW-stabilizers under appropriate conditions, the preferred types are those with relatively low volatility at the operating temperatures of up to about 280° C. These include bisphenols, exemplified by 2,2'-methylenebis (4-methyl-6-tert-butylphenol); 2,2'-methylenebis (4-ethyl-6-tert-butylphenol); 2,2'-methylene bis(4-methyl-6-nonylphenol); 4,4'-methylenebis(2,6-di-tert-butylphenol); polybutylated 4,4'-isopropylidenephenol and 1,1'-methylenebis-2-napththol as well as the bisthiophenols, e.g. thiobis(di-sec-amylphenol and 4,4'-thiobis (6-tert-butyl-o-cresol). Another preferred class of antioxidant materials that are also light stabilizers are the so-called sterically hindered amines. Examples of these compounds are 1,2-dihydro-2,2,4-trimethylquinoline (polymerized); 1,2-dihydro-2,2,4-trimethyl-6-dodecylquinoline; 1,2-dihydro-2,2,4-trimethyl-6-ethoxyquinoline; and 1,2-dihydro-2,2,4-trimethyl-6-phenylquinoline. Various trivalent phosphorous compounds are also effective, e.g. phosphite esters such as tri(mixed mono and dinonylphenyl)phosphites; trialkylphosphines, e.g. tridecylphosphine, triarylphosphines e.g. triphenolphosphine. The amount of stabilizer incorporated into the copolymer during compounding generally does not exceed about 10 parts per 100 parts of polymer, preferably about 1 to about 5 parts per 100 parts polymer are used.

When it is desired to vulcanize a partially hydrolyzed EVA copolymer elastomer of this invention with a fast soap-sulfur vulcanization system, the said elastomers will contain a few percent of incorporated vinyl chloroacetate cure-site units introduced by re-esterfication of a partially hydrolyzed EVA elastomer with chloroacetic acid as disclosed above. Fast soap-sulfur vulcanization differs fundamentally from sulfur vulcanization systems disclosed above for conventional sulfur vulcanization. Fast soap-sulfur vulcanization is more fully disclosed in U.S. Pat. Nos. 3,458,461; 3,939,128 and 3,972,857 which are incorporated herein by reference.

In addition to the elastomer and a filler/reinforcing agent as disclosed above, preferably carbon black, the soap-sulfur vulcanization system will include elemental sulfur, a soap and an antioxidant.

The soap may be an alkali metal or ammonium salt of a linear or branched monocarboxylic or dicarboxylic acid containing 1 to about 22 carbon atoms. Examples of the acids are formic acid, acetic acid, adipic acid, caproic acid, 2-ethylhexanoic acid, sebacic acid, capric acid, lauric acid, stearic acid. Examples of the salts are sodium stearate, disodium adipate, potassium stearate, sodium laurate, sodium 2-ethylhexanoate. The amount of alkali metal salt or soap used will be about 0.5 to about 7.0 weight %, preferably between about 2 and about 5% based on the weight of the elastomer.

The sulfur employed is elemental sulfur and should be between about 0.05% to about 2.5 weight %, perferably about 0.2 to about 1.3 weight %, based on the elastomer.

Various antioxidants can be used in soap-sulfur vulcanization; e.g. pheny-$\beta$ naphthylamine, and di-$\beta$ napthyl-p-phenylene diamine, Agerite Resin D. Agerite Resin D is preferred.

The soap-sulfur vulcanizable, partially hydrolyzed EVA elastomers of this invention are cured by applying heat thereto until the desired degree of crosslinking is achieved. Cure temperatures will generally be in the order of about 100° C. to about 250° C. The preferred temperature range is from about 130° C. to about 200° C. The cure time depends on the cure temperature, i.e. where high temperatures are employed, the optimum cure time will be shorter than when the polymer is vulcanized at lower temperatures. However, vulcanization time will usually be on the order of about 1 to about 150 minutes. Cure times of about 3 to about 30 minutes are preferred.

The sulfur-vulcanized elastomers of this invention find utility as gaskets, seals, spark plug boots, hoses, and the like.

The invention is illustrated in the examples that follow; in these examples, various chemicals were employed which are identified hereinbelow in terms of chemical identity (as far as known) abbreviation therefor, trade name(s) and supplier(s).

| | |
|---|---|
| Agerite Resin D | R. T. Vanderbilt Co., Inc. |
| Polymerized 1,2-dihydro-2,2,4-trimethylquinoline | |
| Flectol H | Monsanto Chemical Co. |
| Polymerized 1,2-dihydro-2,2,4-trimethylquinoline | |
| Antioxidant 2246 | American Cyanamid Co. |
| 2,2-Methylenebis(4-methyl-6-tert-butylphenol) | |
| Mark C | Argus Chemical Co. |
| Phosphite chelator | |
| HiSil 233 | PPG Industries |
| Silica filler/reinforcing agent | |
| Captax | R. T. Vanderbilt Co. |
| 2-Mercaptobenzothiazole (MBT) | |
| Methyl Tuads | R. T. Vanderbilt Co. |
| Tetramethylthiuram disulfide (TMTD) | |
| Philblack N-550 | Phillips Petroleum Co. |
| Carbon black filler/reinforcing agent (FEF) | |
| C-50 Active Powder | Laboratory Preparation |

A 50:50 blend of carbon black and sodium 2-ethylhexanoate used as a soap in soap-sulfur vulcanization.

Other common chemicals used in the following examples such as stearic acid, zinc oxide, sulfur, P-toluenesulfonic acid monohydrate, chloroacetic acid, sodium hydroxide, toluene, and methanol were good grades obtained from laboratory supply houses.

The vinyl acetate content of EVA copolymers and of partially hydrolyzed EVA copolymers of this invention were determined by saponification. Where melt flow rate is cited, it means melt flow rate (abbreviated MFR), under condition B(2160 g weight, 125° C.) according to ASTM method D 1238. Mooney viscosity was determined according to ASTM D 1646-68. Sodium content of elastomers was determined by ashing followed by atomic adsorption.

Physical tests on sulfur vulcanized partially hydrolyzed EVA elastomers were performed according to the following procedures:

| Tensile strength and elongation | ASTM D 412 |
| --- | --- |
| Xylene resistance | ASTM D 2765, Method C |
| Oil resistance | ASTM D 471 |
| Brittleness Temperature | ASTM D 746 |
| Heat Resistance | ASTM D 573 |

EXAMPLE 1

This example illustrates typical procedures employed in this invention for the thermal modification (TM) and partial hydrolysis (PH) of EVA copolymers. The two EVA copolymer elastomers shown in Table 1 were used.

Both the thermal modification and hydrolysis steps were performed in a 250-gram capacity, electrically-heated Brabender Prep-Center, with a roller blade mixer normally operated at 60 rpm. All operations were done under nitrogen. A few small experiments (40 g) were done in a Brabender Plastograph, also under nitrogen.

A. GENERAL PROCEDURE FOR THERMALLY MODIFIED PARTIALLY HYDROLYZED EVA COPOLYMERS—TM[PH EVA]

Into the Brabender Prep Center set at 180° C. and under a nitrogen atmosphere was introduced 220 g of EVA Copolymer 1 or 2, 0.5% of MW-stabilizer, 12.6 g of sodium hydroxide (to effect 20% hydrolysis) and 10 g of water. With the roller blade operating at 60 rpm, heating and milling was continued for 15 minutes at 180° C. at which time the calculated 20% hydrolysis was deemed to be complete. Mixing and heating were continued for either 25 or 40 minutes at a programmed temperature rise to a maximum of about 275° C. to effect thermal modification to introduce unsaturation for sulfur vulcanization. The material was cooled to 190° C. before removal.

B. GENERAL PROCEDURE FOR PARTIAL HYDROLYSIS OF THERMALLY MODIFIED EVA COPOLYMERS—PH[TM EVA]

Into the Brabender Prep Center set at 180° C. under nitrogen was introduced 220 g of EVA Copolymer 1 or 2 and 0.5 wt. % of a MW-stabilizer. With the blade at 60 rpm, heating and mixing were continued for either 25 or 40 minutes with a gradual increase in heat input until the final temperature was about 275° C. The resulting thermally modified product was then cooled under nitrogen in the mixer at a low rpm to 180° C. Sodium hydroxide (12.6 g to effect 20% hydrolysis) and 10 g of water were added and mixing was continued for 15 minutes under nitrogen to complete the partial hydrolysis of the thermally modified product. The product was immediately removed.

TABLE 1

| EVA Copolymer No. | Vinyl Acetate Content, wt. % | Melt Flow Rate (Cond. B), g/10 min. | Mooney Viscosity, ML (1 + 4) @ 100° C. |
| --- | --- | --- | --- |
| 1 | 61.0 | 0.8 | 30.5 |
| 2 | 62.4 | 12 | 1.8 |

EXAMPLE 2

This example illustrates the effect of several MW-stabilizers on the Mooney viscosity of thermally modified EVA copolymers and thermally modified, partially hydrolyzed EVA copolymer. The thermal modification was done at 180°-275° C. as in Example 1. The stabilizers were added before thermal modification. EVA Copolymers 1 and 2 shown in Table 1 were employed as starting materials.

Data are summarized in Table 2. It is apparent that without a MW-stabilizer, EVA copolymer 1, which has the higher Mooney viscosity, crosslinks extensively in only 15 min. at 275° C. (Experiment A). A gelled product of this kind cannot be satisfactorily compounded for vulcanization. Even with 0.5% of Agerite Resin D present in Copolymer 1, the torque suddenly increased after 30 minutes, and after 40 minutes of total modification time, a product was recovered that resisted compression molding (Experiment B). This modified elastomer would also be difficult to compound with the usual components of a sulfur vulcanization system. However, when Agerite Resin D is present and the product removed after a shorter thermal modification period, before the torque increased, i.e. 25 minutes, Mooney viscosity increases to 53 and 43 in similar experiments (Experiments C, D). Here, the products contain ~20% gel but would be marginally suitable for compounding. Antioxidant 2246 seems even more efficient in holding Mooney viscosity down (Experiment E) than Agerite Resin D.

EVA Copolymer 2 is a lower molecular weight (lower Mooney viscosity) material than Copolymer 1. Without added stabilizer, the Mooney viscosity of EVA Copolymer 2 rises from 1.8 to 52 (Experiment J). The product contains only about 10% gel and would be suitable for compounding. After 25 minutes of thermal modification of EVA Copolymer 2 in the Brabender Prep Center, Antioxidant 2246 is again more efficient in holding Mooney viscosity down than Agerite Resin D (Experiment F and G). After 40 minutes, Mark C seems a little more efficient in this regard than Agerite Resin D (Experiments H and I).

From the above-cited evidence, it is clear that if a relatively high molecular weight elastomer (such as Copolymer 1) is to be thermally modified to introduce unsaturation for vulcanization in the absence of a MW-stabilizer, extensive premature crosslinking and gelation can be anticipated. The gelled products are difficult to compound and it is desirable to avoid their formation. However, the aforesaid unwanted crosslinking during thermal modification can be minimized by employing a MW-stabilizer. Consequently, as a matter of ensuring better control during thermal modification under shear conditions, a stabilizer is preferably added.

It will be noted that the thermal modification and partial hydrolysis procedures of Example 1 do not cause extensive gelation of either EVA Copolymer 1 or 2, provided a MW-stabilizer is present (Experiments K-P).

Vulcanization

The above described compounds were compression molded in a Wabash press into 3 in×6 in×75 mil plaques at 8500 psi and vulcanized by heating at 180° C. for 10 minutes.

From the vulcanized plaques, specimens were pre-

TABLE 3

Effect of Molecular Weight Stabilizer on Mooney Vicosity of EVA Elastomers during Thermal Modification and Partial Hydrolysis
(Operations in a 250-g Brabender Prep Center, Temperature, 180-275° C., programmed)

| Exp. No. | Material | Molecular Weight Stabilizer (0.5 wt. %) | Reaction Time min. | Mooney Viscosity ML(1 + 4) @ 100° C. | | Wt. % Gel[1] |
|---|---|---|---|---|---|---|
| | | | | Initial EVA | Finished Product | |
| A | TM-Copolymer 1 | none | 15 (at 275° C.) | 30.5 | Melt turns to crumb at 275° C. | — |
| B | TM-Copolymer 1 | AgeRite Resin D | 40 | 30.5 | (2) | — |
| C | TM-Copolymer 1 | AgeRite Resin D | 25 | 30.5 | 53.0 | 24, 17.4 |
| D | TM-Copolymer 1 | AgeRite Resin D | 25 | 30.5 | 42.8 | — |
| E | TM-Copolymer 1 | Antioxidant 2246 | 25 | 30.5 | 27.0 | — |
| F | TM-Copolymer 2 | Antioxidant 2246 | 25 | 1.8 | 6.6 | — |
| G | TM-Copolymer 2 | AgeRite Resin D | 25 | 1.8 | 29.2 | — |
| H | TM-Copolymer 2 | AgeRite Resin D | 40 | 1.8 | 27.0 | 0.23 |
| I | TM-Copolymer 2 | Mark C | 40 | 1.8 | 23.0 | 0.72 |
| J | TM-Copolymer 2 | none | 40 | 1.8 | 52.0 | 10.7, 10.3 |
| K | PH[TM-Copolymer 2] (20% hydrolysis) | none | 55 | 1.8 | 41.0 | 0.27, 0.22 |
| L | PH[TM-Copolymer 2] (20% hydrolysis) | AgeRite Resin D | 40 | 1.8 | 24.0 | 3.78, 0.75 |
| M | TM-[PH-Copolymer 2] (20% hydrolysis) | none | 55 | 1.8 | 41.0 | 0.45, 0.47 |
| N | TM-[PH-Copolymer 2] (20% hydrolysis) | AgeRite Resin D | 40 | 1.8 | 23.0 | 0.74, 0.25 |
| O | TM-[PH-Copolymer 2] (20% hydrolysis) | AgeRire Resin D | 40 | 30.5 | 63.0 | 11.2, 5.2 |
| P | PH-[TM-Copolymer 2] (20% hydrolysis) | AgeRite Resin D | 40 | 30.5 | 61.0 | 4.7, 21.3 |

[1]Boiling xylene, 16 hrs.
[2]Brabender torque increased 3-fold after 30 min. On removal after 40 min. and compression molding, the product yielded a wrinkled sheet, indicative of reduced flow and propbable crosslinking. Such materials would be difficult to compound.

EXAMPLE 3

Example 3 illustrates the sulfur vulcanization procedure for EVA Copolymer 1 elastomer made sulfur-vulcanizable by thermal modification alone TM[EVA-1], thermal modification after partial hydrolysis TM[PH EVA-1] and thermal modification before partial hydrolysis PH[TM EVA-1] as described in Example 1. Agerite Resin D (0.5%) was added prior to thermal modification. The degree of hydrolysis was varied in the partially hydrolyzed EVA elastomers. Procedures of Example 1 were followed.

Compounding

A 200 g portion of elastomer was banded on a two-roll mill at 290° F. Zinc oxide (if used), stearic acid and silica filler were added and worked in well. Thereafter sulfur was added and worked into the compound for 2-3 minutes, followed by the simultaneous addition of Flectol H, 2-mercarptobenzothiazole and tetramethylthiuram disulfide. The amounts of each ingredient added are shown in Table 3, upper portion.

Mixing was continued 10 minutes after the ingredients had all been added, for a total mixing time of 30 minutes. The compound was then sheeted off the mill and was ready for vulcanization.

pared for testing of various properties, by methods hereinabove stated. Test results appear in Table 3.

Comparison of the physical properties of the vulcanizates shown in Table 3 shows that the partially hydrolyzed elastomers exhibit, with one exception, improved resistance to ASTM No. 3 oil as compared to the control TM[EVA-1] and to literature value for peroxide-cured EVA Copolymer 1. In addition, the oil resistance improvement is proportional to degree of hydrolysis and is highest for elastomers that were 30% hydrolyzed. Up to 20% hydrolysis, the brittleness temperatures are better for PH[TM EVA-1] compositions than for TM[PH EVA-1] compositions and for the TM[EVA-1] unhydrolyzed control. On these grounds, the PH[TM EVA-1] compositions are regarded as superior to the TM[PH EVA-1] compositions.

Examination of the heat resistance data shows that partially hydrolyzed compositions are definitely superior to the unhydrolyzed TM[EVA-1] control. The control had lost practically all its strength after 7 days at 180° C., whereas, with one exception, compounds in which the EVA had been 10-30% hydrolyzed retained tensiles of 1100-2000 psi. Stability at this high an aging temperature is quite unexpected for EVA elastomers. At lower aging temperatures (100-150° C.) the PH[TM EVA-1] composition is also somewhat superior to TM[PH EVA-1] in retention of elongation.

TABLE 3

Effect of Degree of Partial Hydrolysis on Physical Properties of Thermally Modified, Sulfur Vulcanized EVA Copolymer 1 Elastomer
(0.5% Agerite Resin D Used Throughout)

| | Compound, parts per 100 parts of elastomer | | | | | | | | Peroxide Cured EVA Copolymer-1[2] |
|---|---|---|---|---|---|---|---|---|---|
| | TM[EVA-1] | TM[PH EVA-1] | | PH[TM EVA-1] | | | | | |
| Elastomer (100 parts) | | | | | | | | | |
| % Hydrolysis | 0 | 5[1] | 20 | 10 | 10 | 20 | 30 | 30 | — |
| HiSil 233 | 55.0 | 35.6 | 59.0 | 55.0 | 55.0 | 55.0 | 55.0 | 55.0 | — |
| Zinc Oxide | 5.0 | 5.0 | None | 5.0 | None | 5.0 | 2.5 | 2.5 | — |
| Stearic Acid | 0.5 | 0.5 | 2.0 | 0.5 | 0.5 | 0.5 | 0.5 | 0.5 | — |
| Sulfur | 1.0 | 1.5 | 1.6 | 1.0 | 1.0 | 1.0 | 1.0 | 1.0 | — |
| Flectal H | 0.5 | 0.5 | 0.55 | 0.5 | 0.5 | 0.5 | 0.5 | 0.5 | — |
| Mbt | 0.5 | 0.5 | 0.55 | 0.5 | 0.5 | 0.5 | 0.5 | 0.5 | — |
| TMTD | 1.0 | 1.0 | 1.10 | 1.0 | 1.0 | 1.0 | 1.0 | 1.0 | — |
| CURING CONDITIONS | ← | ← | ← | 10 Min. @ 180° C. @ 8500 psi | | → | → | → | |
| PHYSICAL PROPERTIES | | | | | | | | | |
| Tensile Strength (psi) | 2550 | 1430 | 2110 | 2500 | 1540 | 2700 | 2280 | 1750 | 2800 |
| Elongation (%) | 410 | 220 | 340 | 430 | 530 | 360 | 260 | 320 | 330 |
| Xylene Resistance (80° C.) | | | | | | | | | |
| Swell Ratio | 6.24 | 4.21 | 4.97 | 6.53 | 9.49 | 4.71 | 4.10 | 5.54 | — |
| Extractables (%) | 11.34 | 6.66 | 15.07 | 10.83 | 33.0 | 5.40 | 8.94 | 11.94 | — |
| Oil Resistance, % Swell | | | | | | | | | |
| ASTM #3 Oil | 92.5 (150° C.) | 73.2 (150° C.) | 62.5 (150° C.) | 85.1 (150° C.) | 108.7 (150° C.) | 76.9 (150° C.) | 51.2 (150° C.) | 56.3 (150° C.) | — |
| 70 Hrs. | 85.8 (125° C.) | | | 54.8 (100° C.) | 85.1 (100° C.) | 60.8 (125° C.) | 47.3 (125° C.) | 48.7 (125° C.) | 77 |
| Brittleness Temp. (°C.) | −23 | −16 | −16 | −31 | −33 | −31 | −8 | −11 | — |
| Heat Resistance (7 da @ 180° C.) | | | | | | | | | |
| Tensile (psi) | 130 | 620 | 2030 | 1630 | 840 | 1110 | 1780 | 1510 | — |
| Elongation (%) | 0 | 10 | 10 | 60 | 20 | 20 | 30 | 50 | — |
| Heat Resistance (7 da @ 150° C.) | | | | | | | | | |
| Tensile (psi) | 2250 | | 2390 | 2040 | 1930 | 2000 | 2320 | 1890 | 2560[3] |
| Elongation (%) | 180 | | 60 | 250 | 240 | 160 | 70 | 70 | 275[3] |
| Heat Resistance (7 da @ 125° C.) | | | | | | | | | |
| Tensile (psi) | 2680 | | 2450 | | | 2410 | 2240 | 1990 | — |
| Elongation (%) | 300 | | 120 | | | 200 | 90 | 130 | — |
| Heat Resistance (7 da @ 100° C.) | | | | | | | | | |
| Tensile (psi) | 3030 | | 2520 | | | 2580 | 2550 | 2320 | — |
| Elongation (%) | 410 | | 170 | | | 260 | 130 | 220 | — |

[1]Rubber components represent a combination of 3–5 small runs in the Brabender Plasticorder, not one homogeneous run.
[2]Date from "Vynathene VAE Elastomers", U.S. Industrial Chemicals Co., 1978, for Vynathene EY 907 which is essentially the same as EVA Copolymer 1 of Example 1, but is no longer on the market.
[3]After only 70 hrs (2.9 da)

EXAMPLE 4

Results of the heat aging of sulfur vulcanized, thermally modified EVA copolymer elastomers of Example 3 show that the cures tighten up on prolonged heating and suggested that a conventional post cure technique should be attempted. Results of such a study are summarized in Table 4.

In all cases, tensile strengths after 24 hours post cure at 150° C. in an oven are either improved or essentially unchanged. Particularly noticeable are the improved post cure tensiles obtained with TM[EVA-2], with and without stabilizer present during thermal modification. Post curing had little effect on the tensile strength of PH[TM EVA-1] but reduced elongation noticeably.

TABLE 4

Effect of Post-Cure (24 hrs. at 150° C.) on Sulfur Vulcanized Thermally Modified EVA Elastomers[1]

| | Compounds, in parts per 100 parts of elastomer | | | | | | | | | | | |
|---|---|---|---|---|---|---|---|---|---|---|---|---|
| Elastomer, 100 parts | TM[EVA-1] + Agerite Resin D | | PH[TM EVA-1] + Agerite Resin D | | TM[EVA-2] + No MW Stabilizer | | | TM[EVA-2] + Agerite Resin D | | | TM[EVA-2] + Irganox 1010 | | |
| HiSil 233 | 55.0 | | 55.0 | | 55.0 | | | 55.0 | | | 55.0 | | |
| Zinc Oxide | 5.0 | | 5.0 | | 5.0 | | | 5.0 | | | 5.0 | | |
| Stearic Acid | 0.5 | | 0.5 | | 0.5 | | | 0.5 | | | 0.5 | | |
| Sulfur | 1.0 | | 1.0 | | 1.0 | | | 1.0 | | | 1.0 | | |
| Flectol H | 0.5 | | 0.5 | | 0.5 | | | 0.5 | | | 0.5 | | |
| MBT | 0.5 | | 0.5 | | 0.5 | | | 0.5 | | | 0.5 | | |
| TMTD | 1.0 | | 1.0 | | 1.0 | | | 1.0 | | | 1.0 | | |
| Cure: min/T°C. | 10/180 | Post Cure | 10/180 | Post Cure | 10/170 | 15/170 | Post Cure | 10/170 | 15/170 | Post Cure | 10/170 | 15/170 | Post Cure |
| Physical Properties: | | | | | | | | | | | | | |
| Tensile, psi | 2510 | 2700 | 2150 | 2180 | 2170 | 2240 | 2680 | 1670 | 1740 | 2210 | 2100 | 2020 | 2250 |
| Elongation, % | 460 | 210 | 470 | 230 | 560 | 580 | 280 | 640 | 680 | 290 | 570 | 550 | 230 |

[1]Concentration of MW Stabilizers (where used) 0.5% by weight.

EXAMPLE 5

When EVA copolymer elastomers are partially hydrolyzed before or after thermal modification to impart sulfur vulcanizability in accordance with the processes of this invention, as for example with sodium hydroxide, sodium acetate by-product and possibly traces of unreacted sodium hydroxide will remain in the finished sulfur-vulcanized compound. The question arises of what effect the presence of these water-soluble salts will have on the physical properties of the sulfur vulcanizate. For example, the salts might impart undesirable water-sensitivity. Further, it would be important to ascertain whether the residual salts can be removed by treatment with a solvent such as water without a serious deleterious effect on physical properties of the vulcanized elastomers.

Sulfur-vulcanized specimens of thermally modified, partially hydrolyzed (20%) EVA Copolymer 1 were therefore extracted for 7 days with water in a Soxhlet apparatus. A sulfur-vulcanized thermally modified (no hydrolysis) elastomer was included in the study as a control. Tensiles and elongation were measured on the vulcanized specimens before extraction, after extraction and removal of loosely-held water with blotting paper and after drying for 24 hrs at 100° C. Sodium content was checked before and after extraction on one of the partially hydrolyzed vulcanizates. The results are shown in Table 5.

After 7 days of Soxhlet extraction with hot water, the tensiles of all the samples fell off, as measured on specimens that had only been dried by blotting with paper. However, the tensile specimens that had been thoroughly dried after the extraction gave tensile values that were very close to those obtained before extraction. The 20% hydrolyzed specimen (PH[TM EVA-1]) contained 1.24 weight % sodium after vulcanization but before extraction. After extraction the sodium content was vanishingly small—about 59 ppm—indicating that the extraction conditions did indeed remove the contained salts.

TABLE 5

Effect of Soxhlet Extraction with Water on Physical Properties of Sulfur Vulcanized EVA Copolymer Elastomers (0.5% Agerite Resin D used in Thermal Modification)

| | Compounds, in parts per 100 parts of Elastomer | | |
|---|---|---|---|
| | TM[EVA-1] | PH[TM EVA-1] | TM[PH EVA-1] |
| Elastomer, 100 parts | | | |
| HiSil 233 | 55.0 | 55.0 | 55.0 |
| Zinc Oxide | 5.0 | 5.0 | 5.0 |
| Stearic Acid | 0.5 | 0.5 | 0.5 |
| Sulfur | 1.0 | 1.0 | 1.0 |
| Flectol H | 0.5 | 0.5 | 0.5 |
| MBT | 0.5 | 0.5 | 0.5 |
| TMTD | 1.0 | 1.0 | 1.0 |
| Cure: min/°C. | 10/180 | 10/180 | 10/180 |
| PHYSICAL PROPERTIES | | | |
| Tensile Break (psi) | 2510 | 2120 | 2150 |
| Elongation | 460 | 500 | 470 |
| Sodium, Wt. % | — | 1.24 | — |
| After 7 Days with Boiling Water[a] | | | |
| (1) Wet[b]: tensile break (psi) | 2130 | 1680 | 1901 |
| elongation (%) | 550 | 420 | 480 |
| wt. % gain | 9.9 | 12.3 | 9.2 |
| (2) Dried[c]: tensile break (psi) | 2390 | 2260 | 2140 |
| elongation (%) | 200 | 120 | 130 |
| wt. % loss | 4.4 | 10.6 | 12.7 |
| Sodium, wt. % | — | 0.0059 | — |
| (3) Wt. gain[d], % | — | 2.4 | — |

[a]Cut tensile tabs (pre-weighed), put in Soxhlet extractor and extracted with boiling water for 7 days under nitrogen.
[b]Wet: dried by towel blotting only - no heat - tested immediately after weighting for wt. % gain.
[c]Dried: 24 hrs. at 100° C. in vacuum oven @ ~20 mm Hg over P$_2$O$_5$ dessicant.
[d]Wt. % gain found after 7 days in high humidity (over water in covered vessel) for waste-extracted, vacuum oven-dried material.

EXAMPLE 6

This example illustrates partial hydrolysis of an EVA Copolymer 2 of Example 1 in solution followed by partial re-esterification of the hydrolyzed product with chloroacetic acid to introduce chloroacetoxy cure-sites for fast soap/sulfur vulcanization.

Hydrolysis in Solution

In a 1-liter three necked flask equipped with reflux condenser, heating mantle, mechanical stirrer and thermometer, 125 g of EVA Copolymer 2 was dissolved with stirring at reflux in a mixture of 200 ml of toluene and 75 ml of methanol. A solution of 0.5 g of sodium hydroxide in 25 ml of methanol was added as catalyst. After two hours at reflux, 2.42 g of p-toluenesulfonic acid monohydrate was added to destroy the catalyst. An attempt to recover the product by adding methanol (100 ml) and toluene (50 ml) failed. The solvent volume was then reduced under vacuum until a viscous solution remained. The solution was washed twice with water, then dried in air and finally in vacuum at 60° C.; 109.8 g of partially hydrolyzed EVA Copolymer 2 containing 37.5 wt. % of residual vinyl acetate.

Re-esterification in Solution

In a 1-liter three-necked flask equipped with heating mantle, mechanical stirrer, Dean-Stark trap and reflux condenser was placed 100 g of the above partially hydrolyzed EVA copolymer and 300 ml of toluene. The copolymer was dissolved by heating at reflux over 1.5 hours. The temperature was lowered to 85°–87° C. and 2.42 g of chloroacetic acid was added, followed by 0.34 g of p-toluenesulfonic acid monohydrate as catalyst.

The reaction mixture was held at 85°-87° C. for 1 hr., then refluxed for 2 hrs. A total of 0.8-1.0 ml of water was collected in the Dean-Stark trap. The solution of product was concentrated, washed twice with water and dried in vacuum. The partially hydrolyzed re-esterified EVA copolymer product contained 40.8 weight % residual vinyl acetate and 1.00 weight % chlorine, equivalent to 3.4 weight % incorporated vinyl chloroacetate units. The product was 100% soluble in boiling xylene. In the determination of residual vinyl acetate content by saponification, no attempt was made to distinguish between vinyl acetate and vinyl chloroacetate units.

Vulcanization

The above partially hydrolyzed EVA copolymer elastomer, partially re-esterified with chloroacetic acid, was compounded as follows on a two-roll rubber mill:

| Elastomer | 100 parts |
|---|---|
| Carbon black N-550 | 41 parts |
| C-50 Active powder* | 8.0 parts |
| Stearic Acid | 2.0 parts |
| Sulfur | 0.8 parts |
| Agerite Resin D | 1.0 parts |

*C-50 active powder was a 50:50 blend of N-550 carbon black and sodium 2-ethylhexanoate.

Specimens of the compound was vulcanized at 170° C. in a press for 3, 7, 15 and 30 minutes. Tensile and elongation results obtained on the vulcanized sheets appear in Table 6.

TABLE 6

SOAP-SULFUR VULCANIZATION OF PRODUCT OF EXAMPLE 6

| Cure Conditions, min @ 170° C. | 3 | 7 | 15 | 30 |
|---|---|---|---|---|
| Tensile, break, psi | 2520 | 2700 | 2460 | 2500 |
| Elongation, % | 210 | 250 | 240 | 240 |

EXAMPLE 7

The solution hydrolysis procedure of Example 6 was repeated. After hydrolysis, 150 ml of the solvent mixture was removed by distillation. The residue was transferred to a pan and washed 3-5 times with water and dried in vacuum at 100° C. to constant weight, 107.1 g of product. The product contained 36.8 weight % residual vinyl acetate.

The above-described partially hydrolyzed EVA (100 g) was dissolved in 300 ml of toluene, and at 90° C., 2.42 g of chloroacetic acid and 0.34 g of p-toluenesulfonic acid monohydrate were added. The reaction was stirred and heated for 1 hr. at 90° C., with 0.9-0.9 ml. of water being collected in the Dean-Stark trap. The product was concentrated to a viscous mixture, washed 3-4 times with water and dried in vacuum at 100° C., 102.5 g. Analysis showed the presence of 39.0 weight % residual vinyl acetate an 0.72 weight % of chlorine.

Soap-sulfur vulcanization as described in Example 6 gave the results shown in Table 7.

TABLE 7

SOAP-SULFUR VULCANIZATION OF PRODUCT OF EXAMPLE 7

| Cure Conditions, min at 170° C. | 3 | 7 | 15 | 30 |
|---|---|---|---|---|
| Tensile, break, psi | 1960 | 1710 | 1990 | 1890 |
| Elongation, % | 400 | 360 | 440 | 480 |

EXAMPLE 8

In this example, the degree of partial hydrolysis of the EVA copolymer was considerably less than that of Examples 6 and 7. As in Example 6, 125 g EVA copolymer thereof, 200 ml of toluene, 100 ml of methanol and 0.10 g of sodium hydroxide were reacted for only 30 minutes at reflux and then 0.50 g of p-tolenesulfonic acid monohydrate was added. A grab sample was removed, washed with water and dried, 47.2 weight % residual vinyl acetate. Methanol was removed by distallation.

To the reaction mixture was added 0.50 g of p-toluenesulfonic acid monohydrate and 5.08 g of chloroacetic acid. The esterification was carried out over 3 hours and 0.5-0.6 ml of water was collected. The product was isolated as described in Example 6 and dried at 100° C. in vacuum, 116.5 g. Analysis showed that the product contained 51.5 weight % residual vinyl acetate and 1.15 weight % chlorine.

Soap-sulfur vulcanization was performed as described in Example 6. Table 8 contains the tensile and elongation values observed.

TABLE 8

SOAP-SULFUR VULCANIZATION OF PRODUCT OF EXAMPLE 10

| Cure Conditions, min at 170° C. | 3 | 7 | 15 | 30 |
|---|---|---|---|---|
| Tensile, break, psi | 590 | 830 | 1020 | 1180 |
| Elongation, % | 660 | 620 | 640 | 600 |

EXAMPLE 9

This example describes the partial hydrolysis of an EVA copolymer in the melt phase, followed by esterification with chloroacetic acid in the melt phase.

HYDROLYSIS IN MELT PHASE

To the Brabender Prep Center set at 140° C. was added in order 250 g of the EVA Copolymer 2 of Example 1, 29.1 g of sodium hydroxide pellets and 10 g of water. The mixture was blended under nitrogen for 20 minutes at 40 rpm mixer speed. The final temperature was 153° C. The product was cooled to 100° C. before removing it from the Prep Center. A 250 g sample of the product was dissolved in 3 liters of tetrohydrofuran, containing 300 ml of glacial acetic acid, on a steam bath. When solution was complete, the volume was reduced by evaporation on the steam bath, with nitrogen sparging. The product was recovered by precipitation with water (3 liters). It was then washed 3 times with 3-liter portions of water in a Waring blender, dried in an air oven 40° C., 193 g. Drying 24 hrs. longer in vacuum at 50° C. over $P_2O_5$ caused no further weight loss. The purified product contained 43.4 weight % of residual vinyl acetate.

RE-ESTERIFICATION IN MELT PHASE

To the Brabender Prep Center set at 110° C. were added in order 190.0 g of the above reprecipitated partially hydrolyzed EVA copolymer, 8.0 g of chloroacetic acid, 30 ml of xylene and 1.0 g of p-toluenesulfonic acid monohydrate. The xylene was added very slowly to swell the polymer. Thereafter mixing (50 rpm) was done for 3 hrs under nitrogen, the temperature rising over this period to 144° C. After cooling to 90° C., the product was removed. A test showed that this product contained 45% gel (boiling xylene). The formation of gel may reflect the fact that no MW-stabilizer was present during the above-described processing in the melt phase.

The crude partially hydrolyzed EVA copolymer partially re-esterified with chloroacetic acid contained 50.0 weight % residual vinyl acetate and 1.48 weight % chlorine. It was subjected to the following modified soap-sulfur vulcanization procedure.

| Elastomer | 100 parts |
|---|---|
| Carbon Black N-550 | 41 parts |
| Stearic Acid | 2.0 parts |
| Calcium Hydroxide | 4.0 parts |
| C-50 Active Powder* | 8.0 parts |
| Agerite Resin D | 1.0 parts |

*A 50:50 blend of N-550 carbon black and sodium 2-ethylhexanoate.

The results of the soap-sulfur vulcanization of this compound are shown in Table 9.

TABLE 9

SOAP-SULFUR VULCANIZATION OF
THE PRODUCT OF EXAMPLE 9

| Cure Conditions, min at 170° C. | 3 | 7 | 15 | 30 |
|---|---|---|---|---|
| Tensile, break, psi | 1520 | 1530 | 1680 | 1660 |
| Elongation, % | 140 | 140 | 140 | 150 |

Although the invention has been described by reference to some embodiments, it is not intended that the novel partially hydrolyzed ethylene-vinyl acetate elastomers vulcanizable with sulfur, the process for manufacturing such elastomers and the process for vulcanizing them and the various products obtained after vulcanizing them, are to be limited thereby but that modifications thereof are intended to be included as falling within the spirit and broad scope of the foregoing disclosure and the following claims.

What is claimed is:

1. A process for producing a sulfur vulcanizable ethylene-vinyl acetate copolymer which comprises the steps of:
   (1) partial hydrolysis to produce vinyl alcohol groups;
   (2) thermal modification to produce ethylenic unsaturation during which a molecular weight stabilizer is added; and
   (3) combining the polymer obtained after the aforesaid partial hydrolysis and thermal modification steps with a vulcanizing agent selected from a member of the group consisting of sulfur and compounds that liberate sulfur at vulcanizing temperatures.

2. The process of claim 1 where said thermal modification step is employed prior to said hydrolysis step.

3. The process of claim 1 where said hydrolysis step is employed prior to said thermal modification step.

4. The process of claim 2 further comprising the step of curing said polymer.

5. The process of claim 3 further comprising the step of curing said polymer.

6. A vulcanized polymer product produced by the process of claim 4.

7. A vulcanized polymer product produced by the process of claim 5.

8. The process of claim 1 in which said polymer is hydrolyzed to contain from about 0.5 to about 50% by weight of vinyl alcohol, said polymer having after said hydrolysis from about 35 to about 75 weight % of vinyl acetate.

9. The process of claim 1 further comprising adding from about 25 to about 100 parts by weight per 100 parts of polymer of a filler to said polymer.

10. The process of claim 9 where said filler comprises carbon black.

11. The process of claim 1 where said thermal modification is conducted to produce from about 0.5 to about 10 weight % of ethylenically unsaturated groups in said polymer.

* * * * *